United States Patent
Kitazume et al.

(10) Patent No.: US 10,208,654 B2
(45) Date of Patent: Feb. 19, 2019

(54) INTERNAL COMBUSTION ENGINE

(71) Applicant: TOYOTA JIDOSHA KABUSHIKI KAISHA, Toyota-shi, Aichi-ken (JP)

(72) Inventors: Yoshiyuki Kitazume, Gotenba (JP); Motonari Yarino, Gotenba (JP); Naoya Kaneko, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 35 days.

(21) Appl. No.: 15/058,250

(22) Filed: Mar. 2, 2016

(65) Prior Publication Data
US 2016/0258346 A1 Sep. 8, 2016

(30) Foreign Application Priority Data

Mar. 4, 2015 (JP) .................................. 2015-042682

(51) Int. Cl.
*F02B 23/10* (2006.01)
*F02M 61/16* (2006.01)
*F02M 61/18* (2006.01)
*F02F 1/24* (2006.01)

(52) U.S. Cl.
CPC ............ *F02B 23/105* (2013.01); *F02F 1/242* (2013.01); *F02M 61/162* (2013.01); *F02M 61/1813* (2013.01); *F02B 2023/103* (2013.01); *Y02T 10/125* (2013.01)

(58) Field of Classification Search
CPC ... F02B 23/105; F02B 2023/103; F02F 1/242; F02M 61/162; F02M 61/1813

USPC ..................................................... 123/568.21
See application file for complete search history.

(56) References Cited

U.S. PATENT DOCUMENTS

| 4,712,525 A | * | 12/1987 | Ishida | ..................... F02B 19/12 123/145 A |
| 4,733,643 A | * | 3/1988 | Ishida | .................... F02B 23/101 123/276 |
| 4,958,604 A | | 9/1990 | Hashimoto | |
| 4,974,565 A | * | 12/1990 | Hashimoto | ............... F02B 1/04 239/464 |

(Continued)

FOREIGN PATENT DOCUMENTS

| CN | 86108109 A | 8/1987 |
| EP | 0225551 A2 | 6/1987 |

(Continued)

*Primary Examiner* — Joseph J Dallo
*Assistant Examiner* — Yi-Kai Wang
(74) *Attorney, Agent, or Firm* — Hunton Andrews Kurth LLP

(57) ABSTRACT

In order to achieve stable combustion in an internal combustion engine, the engine includes a fuel injection valve having a first nozzle hole and a second nozzle hole, and an spark plug disposed at a position through which the swirling flow flows, and which is at the downstream side of the flow of the swirling flow from an extension line of the first nozzle hole and at the upstream side of the flow of the swirling flow from an extension line of the second nozzle hole, for igniting a spray of fuel injected from the fuel injection valve, wherein the first nozzle hole and the second nozzle hole are formed in such a manner that the shortest distance from the extension line of the first nozzle hole to the spark plug becomes longer than the shortest distance from the extension line of the second nozzle hole to the spark plug.

10 Claims, 12 Drawing Sheets

(56) References Cited

U.S. PATENT DOCUMENTS

| | | | | |
|---|---|---|---|---|
| 5,163,621 | A | * | 11/1992 | Kato ................... F02M 61/163 |
| | | | | 239/533.12 |
| 5,170,758 | A | * | 12/1992 | Chmela ................ F02B 23/104 |
| | | | | 123/276 |
| 6,659,070 | B2 | * | 12/2003 | Sebastian ............. F02B 23/101 |
| | | | | 123/298 |
| 6,739,309 | B2 | | 5/2004 | Hiraya et al. |
| 7,028,662 | B2 | | 4/2006 | Tsuchida et al. |
| 2002/0170533 | A1 | | 11/2002 | Ziegler et al. |
| 2004/0011326 | A1 | * | 1/2004 | Yamashita ........... F02B 17/005 |
| | | | | 123/305 |
| 2004/0173179 | A1 | * | 9/2004 | Noda .................. F02D 41/3029 |
| | | | | 123/295 |
| 2006/0231063 | A1 | * | 10/2006 | Matsubara ............. F02B 23/10 |
| | | | | 123/295 |

FOREIGN PATENT DOCUMENTS

| | | | |
|---|---|---|---|
| EP | 1371843 | A1 | 12/2003 |
| JP | 2003-534486 | A | 11/2003 |
| JP | 2011-094604 | A | 5/2011 |
| WO | 02/090762 | A1 | 11/2002 |

\* cited by examiner

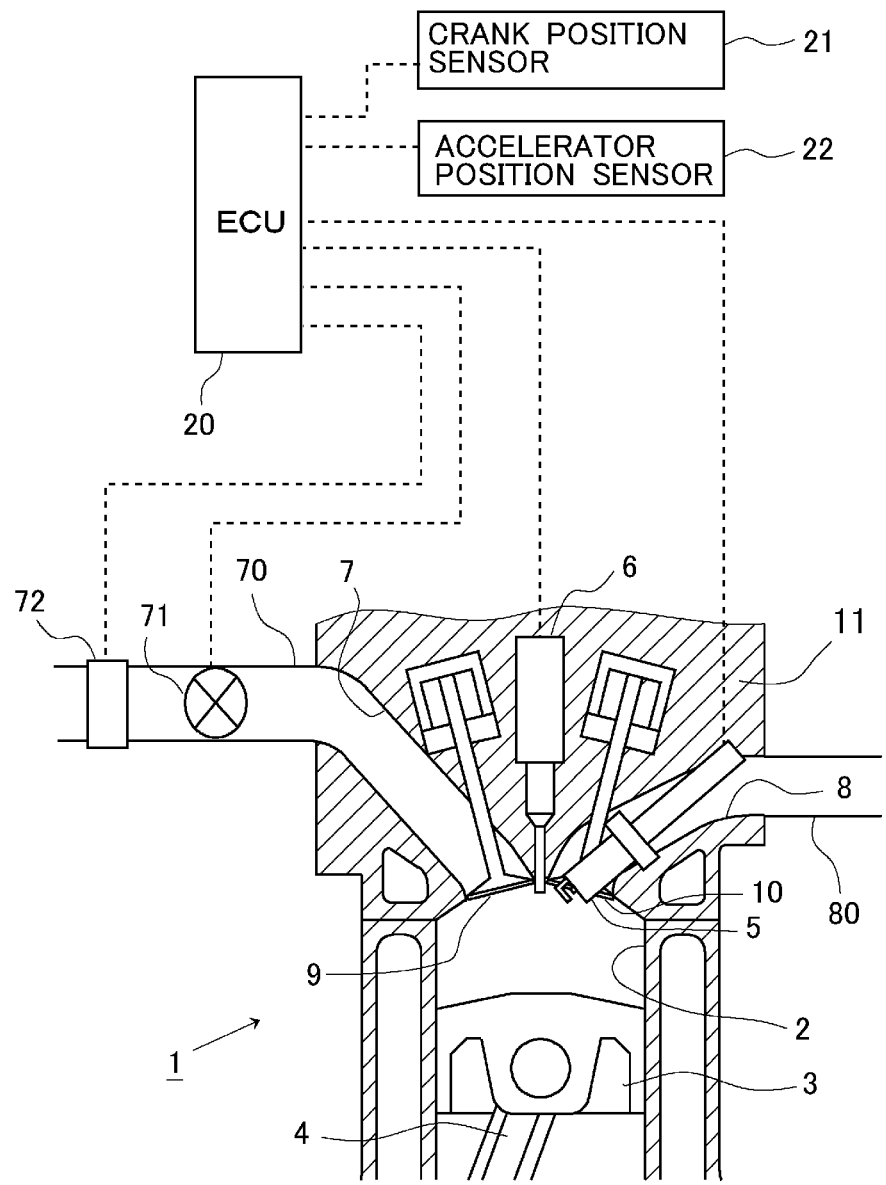
[Fig. 1]

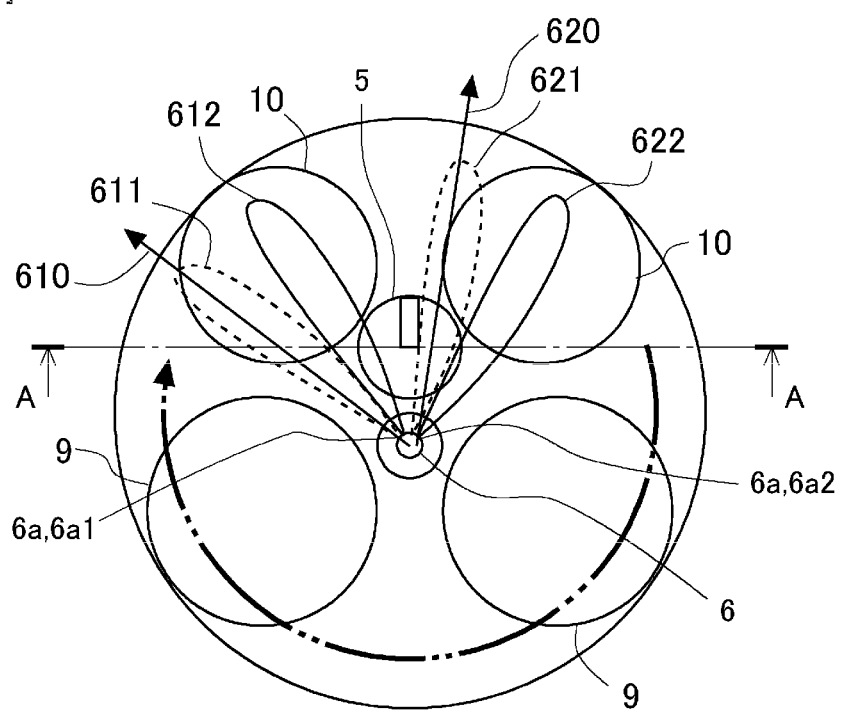
[Fig. 2]

[Fig. 3]
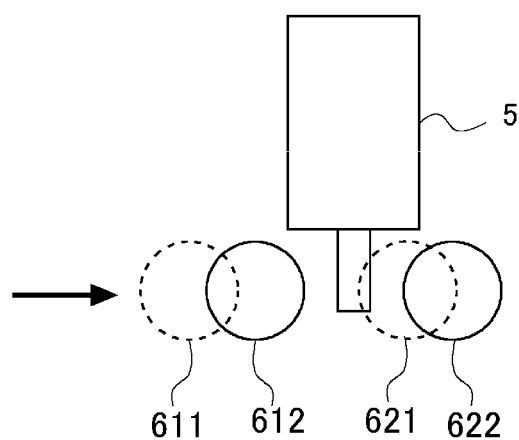

[Fig. 4]
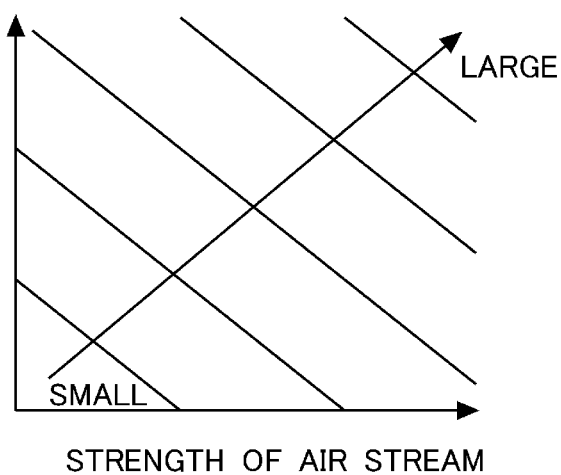

[Fig. 5]
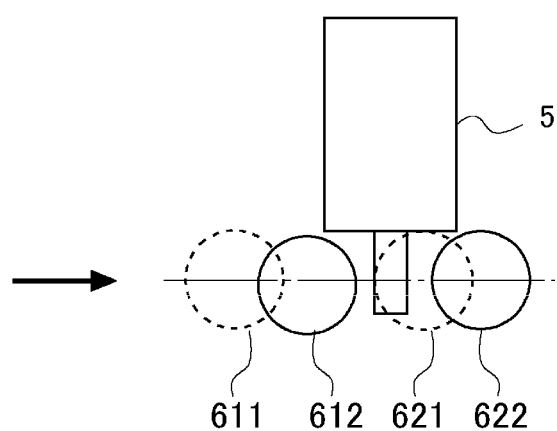
611 612 621 622

[Fig. 6]
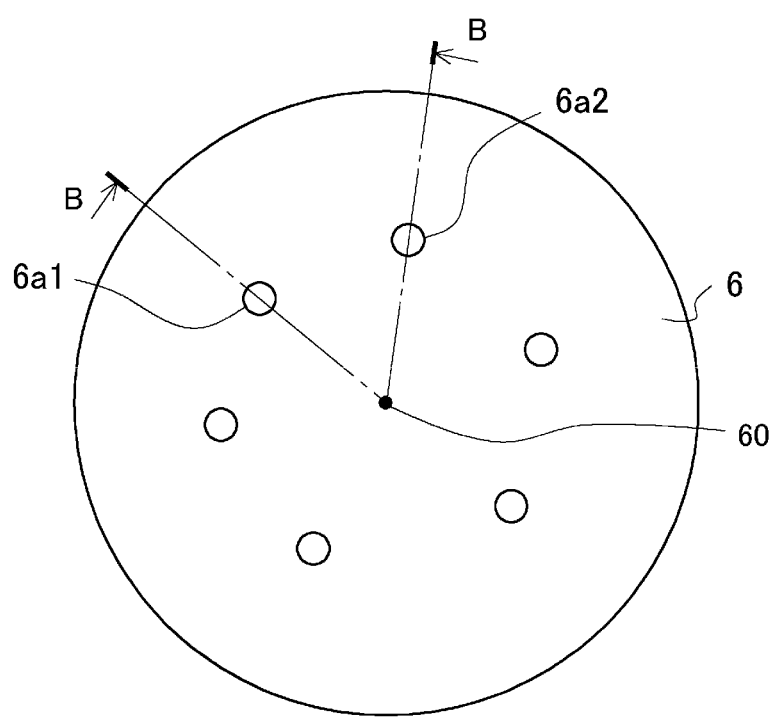

[Fig. 7]
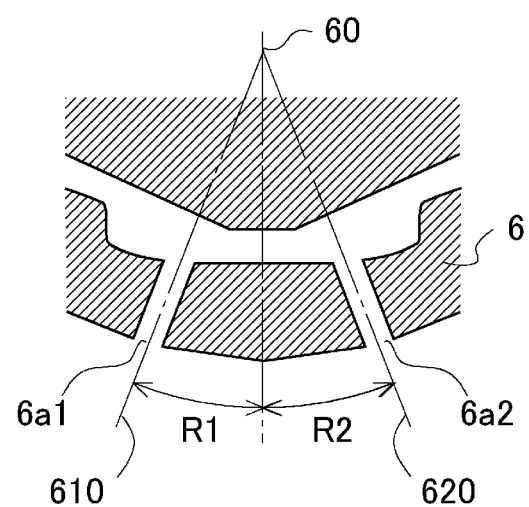

[Fig. 8]
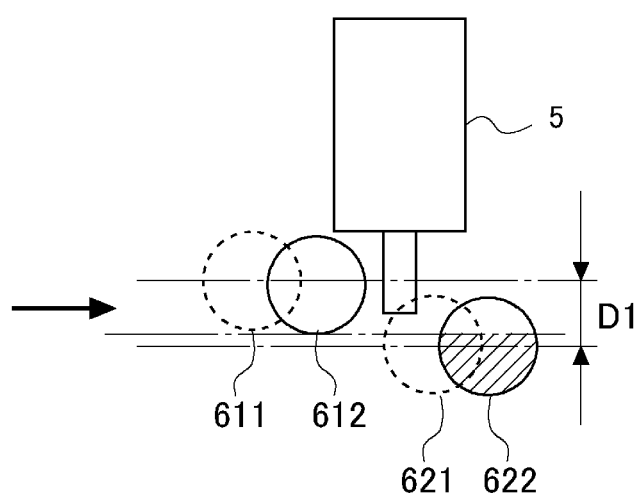

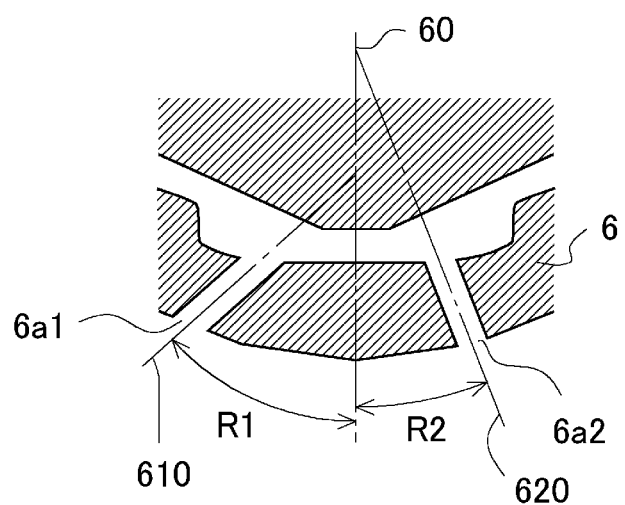
[Fig. 9]

[Fig. 10]
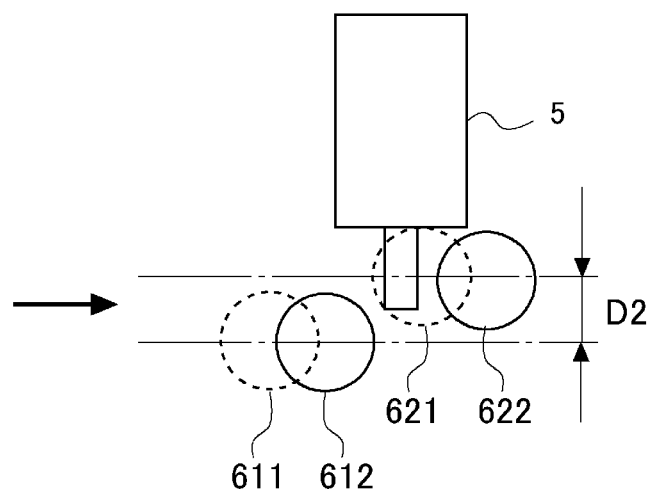

[Fig. 11]
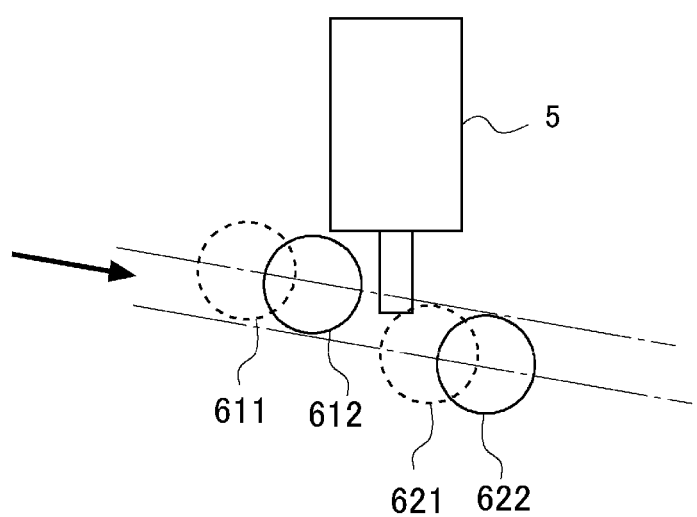

[Fig. 12]
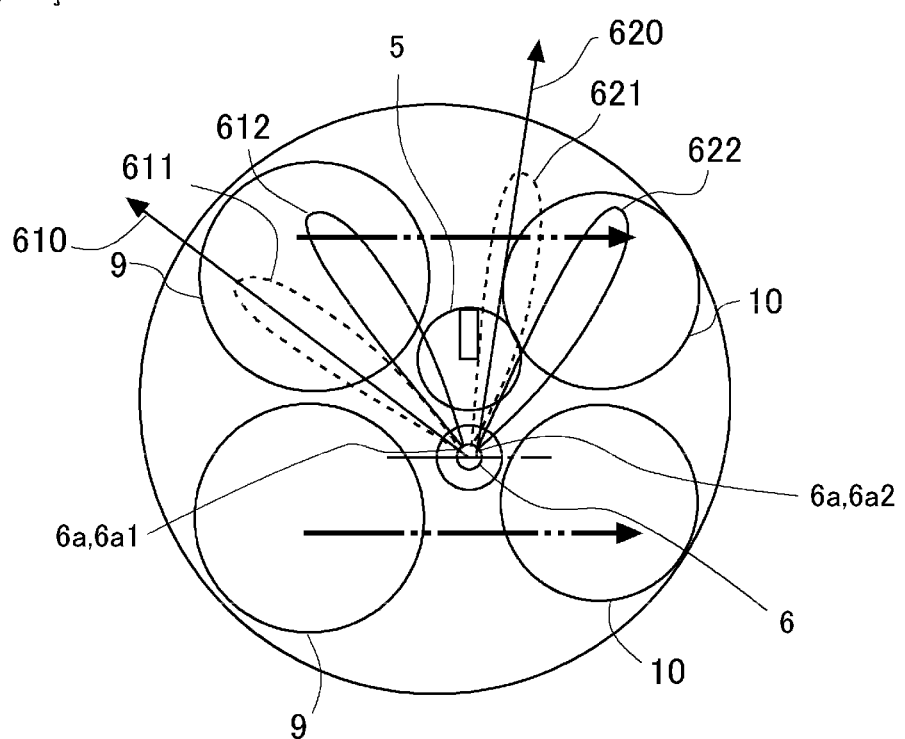

INTERNAL COMBUSTION ENGINE

CROSS REFERENCE TO RELATED APPLICATIONS

This application claims priority to Japanese Patent Application No. 2015-042682 filed on Mar. 4, 2015, the entire contents of which are incorporated by reference herein.

BACKGROUND OF THE INVENTION

Field of the Invention

Embodiments of the present invention relate to an internal combustion engine.

Description of the Related Art

There has been known that nozzle holes of a fuel injection valve are formed in such a manner that a spark plug is disposed between the fuel sprays from the nozzle holes (for example, see Published Japanese Translation No. 2003-534486). With this technique, the nozzle holes are disposed so that the concentration of fuel in the surroundings of the spark plug becomes an appropriate value.

SUMMARY

In the above-mentioned patent literature, the influence of an air stream occurring in a cylinder is not taken into consideration. So, in cases where a spray of fuel from the fuel injection valve is carried away by the air stream, ignition of the sprayed fuel can become difficult, depending on the positional relationship of the fuel spray and the spark plug. That is, it can become difficult to ignite the fuel when the fuel spray comes close to the spark plug, the concentration of fuel in the vicinity of the spark plug becomes too high at the time of ignition of the fuel by means of the spark plug, or when the fuel spray moves away from the spark plug, the concentration of fuel in the vicinity of the spark plug becomes too low at the time of ignition of the fuel by means of the spark plug.

Embodiments of the present invention have been made in view of the problems as referred to above, and an object is to achieve stable combustion in the case of occurrence of an air stream in a cylinder.

In order to achieve the above-mentioned object, embodiments of the present invention reside in an internal combustion engine in which a swirling flow occurs in a cylinder, and which includes: a fuel injection valve that has a plurality of nozzle holes including at least a first nozzle hole and a second nozzle hole for injecting fuel into the cylinder; and a spark plug that is disposed at a position through which the swirling flow flows, and which is at the downstream side of the flow of the swirling flow from an extension line of the first nozzle hole and at the upstream side of the flow of the swirling flow from an extension line of the second nozzle hole, for igniting a spray of fuel injected from the fuel injection valve. The first nozzle hole and the second nozzle hole are formed in such a manner that the shortest distance from the extension line of the first nozzle hole to the spark plug becomes longer than the shortest distance from the extension line of the second nozzle hole to the spark plug.

The relative positional relation between the spark plug and the fuel injection valve, and the directions in which the nozzle holes are directed, are set so that the spark plug can be made to ignite the sprays of fuel which have been injected from the fuel injection valve and which have been carried away by means of the swirling flow. When seen from the spark plug, fuel is injected from the first nozzle hole to the upstream side of the swirling flow, whereas fuel is injected from the second nozzle hole to the downstream side the swirling flow. For this reason, the fuel spray from the first nozzle hole is caused to come close to the spark plug due to the swirling flow before ignition thereof, and on the other hand, the fuel spray from the second nozzle hole is caused to move away from the spark plug due to the swirling flow before ignition thereof. Accordingly, expecting that the fuel spray from the first nozzle hole is caused to come close to the spark plug due to the swirling flow, the first nozzle hole has been formed in advance so that the fuel spray from the first nozzle hole is caused to move away from the spark plug toward the upstream side of the swirling flow. Similarly, expecting that the fuel spray from the second nozzle hole is caused to move away from the spark plug due to the swirling flow, the second nozzle hole has been formed in advance so that the fuel spray from the second nozzle hole is caused to come close to the spark plug toward the upstream side of the swirling flow. As a result of this, the shortest distance from the extension line of the first nozzle hole to the spark plug becomes longer than the shortest distance from the extension line of the second nozzle hole to the spark plug. Thus, by forming the first nozzle hole and the second nozzle hole in this manner, the positional relationship of the spark plug and the fuel sprays from both the first and second nozzle holes becomes a suitable relation for combustion at the time of ignition by the spark plug, even though the fuel sprays from the both nozzle holes have been carried away, thus making it possible to attain stable combustion.

In addition, the first nozzle hole and the second nozzle hole may be formed in such a manner that the extension line of the first nozzle hole and the extension line of the second nozzle hole do not overlap with each other in the flow direction of the swirling flow.

In that case, at least parts of the fuel sprays does not overlap with each other in the flow direction of the swirling flow. If the fuel spray of the first nozzle hole and the fuel spray of the second nozzle hole overlap with each other in the flow direction of the swirling flow, it will become difficult for an air stream having impinged on the fuel spray of the first nozzle hole to reach the fuel spray of the second nozzle hole. Accordingly, the effect of the swirling flow will become small. On the other hand, if the extension line of the first nozzle hole and the extension line of the second nozzle hole are made not to overlap with each other in the flow direction of the swirling flow, at least a part of the fuel spray of the second nozzle hole will be directly exposed to the air stream, so that the effect of the swirling flow can be obtained in the fuel spray of the second nozzle hole, too. For this reason, stable combustion can be attained.

Moreover, the first nozzle hole and the second nozzle hole may be formed in such a manner that an angle formed by the extension line of the first nozzle hole and a central axis of the fuel injection valve becomes larger than an angle formed by the extension line of the second nozzle hole and the central axis of the fuel injection valve.

Immediately after fuel has been injected from the second nozzle hole, the fuel spray therefrom becomes relatively close to the spark plug, so there is a fear that the fuel injected from the second nozzle hole may adhere to the spark plug, thereby inhibiting subsequent ignition. On the other hand, a distance between the fuel spray from the second nozzle hole and the spark plug can be made long by making the angle formed by the extension line of the second nozzle hole and the central axis of the fuel injection valve relatively small. Accordingly, by making the angle formed by the extension line of the first nozzle hole and the central axis of the fuel injection valve larger than the angle formed by the extension line of the second nozzle hole and the central axis of the fuel injection valve, it is possible to suppress the adhesion of fuel to the spark plug, thus making it possible to attain stable combustion.

Further, the first nozzle hole and the second nozzle hole may be formed in such a manner that the fuel spray from the first nozzle hole does not overlap with a half or more of the fuel spray from the second nozzle hole in the flow direction of the swirling flow. By doing so in this manner, the half or more of the fuel spray from the second nozzle hole will be directly exposed to the swirling flow, so that the effect of the swirling flow becomes larger.

Furthermore, the first nozzle hole and the second nozzle hole may be formed in such a manner that the angle formed by the extension line of the first nozzle hole and the central axis of the fuel injection valve becomes larger, by at least 5 degrees, than the angle formed by the extension line of the second nozzle hole and the central axis of the fuel injection valve.

Here, the fuel spray from each of the nozzle holes spreads, for example, at an angle of 10 degrees. Accordingly, by making a difference between the angle formed by the extension line of the first nozzle hole and the central axis of the fuel injection valve and the angle formed by the extension line of the second nozzle hole and the central axis of the fuel injection valve to be, for example, 5 degrees, half of 10 degrees, it is possible to suppress the fuel spray from the first nozzle hole from overlapping with the half or more of the fuel spray from the second nozzle hole in the direction in which the swirling flow flows, thus making it possible to obtain the effect of the swirling flow in the fuel spray from the second nozzle hole, too.

In addition, by shifting the directions of the first nozzle hole and the second nozzle hole to the upstream side of the swirling flow from a region in which the fuel sprays from the fuel injection nozzle can be ignited by the spark plug, by an angle by which the fuel sprays are rotated due to the swirling flow in a duration from the fuel injection by the fuel injection valve until the ignition by the spark plug, it is possible to make the shortest distance from the extension line of the first nozzle hole to the spark plug longer than the shortest distance from the extension line of the second nozzle hole to the spark plug.

That is, by shifting the first nozzle hole and the second nozzle hole by the angle by which the fuel sprays are rotated due to the swirling flow, the fuel sprays are made to exist in the region in which they can be ignited at the time of ignition by the spark plug, so that stable combustion can be attained.

Moreover, the swirling flow may be a swirl turning around the central axis of the fuel injection valve. By this swirl, both the fuel spray from the first nozzle hole and the fuel spray from the second nozzle hole turn or swirl around the central axis of the cylinder. For this reason, the positional relationship between the spark plug and the fuel sprays changes according to the swirl. Even in such a case, the relative positional relation between the spark plug and the fuel injection valve and the directions in which the nozzle holes are directed can have been set so that the spark plug can be made to ignite the fuel sprays which have been carried away by means of the swirl. Here, note that even in the case where the swirling flow is a tumble (a swirling flow which rotates about an axis orthogonal to the central axis of a cylinder), the same consideration can be made.

According to embodiments of the present invention, stable combustion can be achieved, in cases where an air stream has occurred in a cylinder.

Further features of the present invention will become apparent from the following description of exemplary embodiments with reference to the attached drawings.

BRIEF DESCRIPTION OF DRAWINGS

FIG. 1 is a view showing the schematic construction of an internal combustion engine and its intake and exhaust system according to a first embodiment of the present invention.

FIG. 2 is a view looking at fuel sprays from a fuel injection valve from an upper side of a cylinder (a cylinder head side) according to the first embodiment.

FIG. 3 is a view showing the relation between a spark plug and the fuel sprays from the fuel injection valve in an A-A cross section in FIG. 2.

FIG. 4 is a view showing the relation among the strength of an air stream in the cylinder, a period of time from fuel injection to ignition (an injection-ignition interval), and an amount of shift between a first nozzle hole and a second nozzle hole.

FIG. 5 is a view showing the relation between the spark plug and the fuel sprays from the fuel injection valve in the A-A cross section in FIG. 2, wherein an angle of spray according to the first nozzle hole and an angle of spray according to the second nozzle hole are equal to each other.

FIG. 6 is a view in the case of cutting the positions of the nozzle holes in the fuel injection valve along a cross section which is orthogonal or perpendicular to a central axis of the fuel injection valve.

FIG. 7 is a cross sectional view showing the fuel injection valve having the first nozzle hole and the second nozzle hole corresponding to those in FIG. 5 cut along a B-B cross section in FIG. 6.

FIG. 8 is a view showing the relation between the spark plug and the fuel sprays from the fuel injection valve in the A-A cross section in FIG. 2, wherein the angle of spray according to the first nozzle hole and the angle of spray according to the second nozzle hole are different from each other.

FIG. 9 is a cross sectional view showing the fuel injection valve having the first nozzle hole and the second nozzle hole corresponding to those in FIG. 8 cut along the B-B cross section in FIG. 6.

FIG. 10 is a view showing the relation between the spark plug and the fuel sprays from the fuel injection valve in the A-A cross section in FIG. 2, wherein the angle of spray of the first nozzle hole is made smaller than the angle of spray of the second nozzle hole.

FIG. 11 is a view showing the relation between the spark plug and the fuel sprays from the fuel injection valve in the A-A cross section in FIG. 2, wherein an air stream impinges on the fuel sprays from an oblique direction.

FIG. 12 is a view looking at the fuel sprays from the upper side of the cylinder in the case where tumbles have occurred therein.

DESCRIPTION OF THE EMBODIMENTS

Hereinafter, the best modes for carrying out the present invention will be exemplarily described in detail based on preferred embodiments with reference to the attached drawings. However, the dimensions, materials, shapes, relative arrangements and so on of component parts described in the embodiments are not intended to limit the scope of the present invention to these alone in particular as long as there are no specific statements.

First Embodiment

FIG. 1 is a view showing the schematic construction of an internal combustion engine and its intake and exhaust system according to this first embodiment. An internal combustion engine 1 shown in FIG. 1 is a four-stroke cycle gasoline engine provided with a plurality of cylinders 2. Here, note that in FIG. 1, only one cylinder among the plurality of cylinders is illustrated.

A piston 3 is fitted in each cylinder 2 of the internal combustion engine 1 for sliding movement relative thereto. The piston 3 is connected with an unillustrated engine output shaft (crankshaft) through a connecting rod 4. In addition, the inside of each cylinder 2 is in communication with an intake port 7 and an exhaust port 8 which are formed in a cylinder head 11. An open end of the intake port 7 in each cylinder 2 is opened and closed by means of intake valves 9. An open end of the exhaust port 8 in each cylinder 2 is opened and closed by means of exhaust valves 10. The intake valves 9 and the exhaust valves 10 are driven to open and close by means of unillustrated intake cams and unillustrated exhaust cams, respectively.

Further, at the side of the cylinder head 11 of each cylinder 2, there is disposed in the vicinity of the central axis of the cylinder 2 a fuel injection valve 6 for injecting fuel into the cylinder 2, and there is also disposed a spark plug 5 which is able to ignite the fuel injected from the fuel injection valve 6. The fuel injection valve 6 will be described later in detail. Here, note that in this embodiment, the spark plug 5 corresponds to a spark plug in embodiments of the present invention.

The intake port 7 is in communication with an intake passage 70. A throttle valve 71 is disposed in the intake passage 70. An air flow meter 72 is disposed in the intake passage 70 at a location upstream of the throttle valve 71. The exhaust port 8 is in communication with an exhaust passage 80.

Then, in the internal combustion engine 1, there is arranged in combination therewith an ECU 20 which is an electronic control unit for controlling the internal combustion engine 1. The above-mentioned air flow meter 72, a crank position sensor 21 and an accelerator position sensor 22 are electrically connected to the ECU 20, and the detected values of these individual sensors are passed or transmitted to the ECU 20. The ECU 20 is able to grasp the operating state of the internal combustion engine 1, such as an amount of intake air based on a detected value of the air flow meter 72, an engine rotation speed based on the detection of the crank position sensor 21, the engine load based on the detection of the accelerator position sensor 22, etc. In addition, the spark plug 5, the fuel injection valve 6, the throttle valve 71 and so on are electrically connected to the ECU 20, so that these elements are controlled by means of the ECU 20.

Here, FIG. 2 is a view looking at fuel sprays injected from the fuel injection valve 6 from an upper side of the cylinder 2 (from the side of the cylinder head 11) according to the this first embodiment. In addition, FIG. 3 is a view showing the relation between the spark plug 5 and the fuel sprays from the fuel injection valve 6 in an A-A cross section in FIG. 2. The A-A cross section is a cross section cut in a plane which is orthogonal or perpendicular to a direction going from the central axis of the fuel injection valve 6 to the central axis of the spark plug 5, and which passes through the central axis of the spark plug 5. Here, note that broken lines may also represent fuel sprays immediately after fuel injection from the fuel injection valve 6. In addition, an extension line of a first nozzle hole 6a1, which is one of nozzle holes 6a in the fuel injection valve 6, is denoted by 610, and fuel sprays from the first nozzle hole 6a1 are denoted by 611 and 612. Moreover, an extension line of a second nozzle hole 6a2, which is one of the nozzle holes 6a in the fuel injection valve 6, is denoted by 620, and fuel sprays from the second nozzle hole 6a2 are denoted by 621 and 622. Each of the extension lines 610, 620 of the nozzle holes 6a may also be an extension line of the central axis of each nozzle hole 6a, or may also be a line showing a direction in which fuel is essentially injected from each nozzle hole 6a. The fuel sprays 611, 621 shown by broken lines represent fuel sprays in the case where there is no swirling flow in the cylinder 2, whereas the fuel sprays 612, 622 shown by solid lines represent fuel sprays in the case where there is a swirling flow in the cylinder 2, and at the time of ignition by the spark plug 5 after the fuel sprays have been carried away by the swirling flow. Here, note that in FIG. 2 and FIG. 3, only the first nozzle hole 6a1 and the second nozzle hole 6a2 are shown, but other nozzle hole(s) 6a may be provided. In this case, all the nozzle holes 6a may be disposed at equal intervals (or at equal angular intervals) around the central axis of the fuel injection valve 6, or may be disposed at unequal intervals (or at unequal angular intervals). FIG. 2 shows the case where a clockwise swirl has occurred, as shown by an arrow of an alternate long and two short dashes line. Here, note that the central axis of the cylinder 2, the central axis of the fuel injection valve 6, and the central axis of the swirl are substantially the same, but it is not necessary for these central axes to be strictly the same. In addition, although the central axis of the cylinder 2 and the central axis of the fuel injection valve 6 are parallel, they do not necessarily need to be parallel.

In the fuel injection valve 6 according to this embodiment, the nozzle holes 6a are formed in such a manner that the distances between the spark plug 5 and the fuel sprays 612, 622, respectively, become suitable for ignition at the time of ignition by the spark plug 5 in view of the swirl. At this time, the distances between the spark plug 5 and the fuel sprays 612, 622 are set in such a manner that stratified charge combustion (or this may also be spray-guided combustion) can be carried out. Here, note that the spray-guided combustion means that each fuel spray is combusted by being directly ignited by means of the spark plug 5 at a location which is in the vicinity of an outer edge or periphery of the fuel spray, at which the concentration of fuel becomes suitable for combustion.

Here, the fuel sprays are each such that the nearer to the central side thereof, the higher the fuel concentration thereof becomes, and the more remote from the center thereof (i.e., at the more outer side of each fuel spray), the lower the fuel concentration thereof becomes. Then, in the vicinity of the outer edge of each fuel spray, the fuel concentration thereof becomes a concentration suitable for combustion, i.e., an air fuel ratio suitable for combustion. Accordingly, more positive ignition will be attained, when the first nozzle hole 6a1 and the second nozzle hole 6a2 are formed in such a manner that the vicinity of the outer edge of each of the fuel sprays 612, 622 carried away by the swirl is located in the neighborhood of the spark plug 5 (hereinafter, also referred to as an ignitable region), at the time of ignition of the spark plug 5. That is, an angle formed between the extension line 610 of the first nozzle hole 6a1 and the extension line 620 of the second nozzle hole 6a2 is set so that the fuel sprays 612, 622 after having been carried away by the swirl exist in the ignitable region. Here, note that the fuel sprays 612, 622 after having been carried away by the swirl exist in symmetrical positions with respect to a straight line which passes through the center of the fuel injection valve 6 and the center of the spark plug 5, in FIG. 2. Thus, due to the arrangement in which the fuel sprays 612, 622 are symmetric with the spark plug 5 interposed therebetween, both of the fuel sprays 612, 622 can be ignited or fired at the same time, so that more positive ignition can be attained. On the other hand, the extension line 610 of the first nozzle hole 6a1 and the extension line 620 of the second nozzle hole 6a2 are not symmetric with respect to a straight line which passes through the center of the fuel injection valve 6 and the center of the spark plug 5, and hence, the shortest distance between the extension line 610 of the first nozzle hole 6a1 and the spark plug 5 becomes longer than the shortest distance between the extension line 620 of the second nozzle hole 6a2 and the spark plug 5. Here, note that the shortest distance referred to herein is not a two-dimensional distance in FIG. 2 but a distance in a space in consideration of the direction of the central axis of the cylinder 2. Thus, in this embodiment, the nozzle holes 6a are shifted by an angle through which the fuel spray rotates from fuel injection until ignition.

On the other hand, when the central portion of a fuel spray is located in the vicinity of the spark plug 5 at the time of ignition of the spark plug 5, as in the conventional case, liquid fuel adheres to the spark plug 5, so that it can become difficult to generate an electric spark. For this reason, it can become difficult to burn the fuel. Even if liquid fuel does not adhere to the spark plug 5, the fuel concentration of the fuel spray may be too high, thus making it difficult to ignite the fuel spray. In addition, when the fuel spray carried away by the swirl is too much away from the spark plug 5, the fuel concentration of the fuel spray in the ignitable region may be too low or fuel may not exist in the ignitable region, so that ignition becomes difficult. In contrast to this, in the fuel injection valve 6 according to this embodiment, the fuel sprays 612, 622 exist in the ignitable region at the time of ignition, so that stable combustion can be attained.

Here, note that the above-mentioned stable combustion is possible in a predetermined operating region of the internal combustion engine 1. Here, the ignition timing of the spark plug 5, the period of time from fuel injection to ignition, the speed of the swirl and so on may be changed by the operating state of the internal combustion engine 1, and so, it is difficult to form the nozzle holes 6a in such a manner that the distances between the spark plug 5 and the fuel sprays 612, 622, respectively, become suitable for ignition in all the operating regions of the internal combustion engine 1 at the time of ignition. For this reason, the nozzle holes 6a are formed in such a manner that the distances between the spark plug 5 and the fuel sprays 612, 622, respectively, become suitable for ignition at the time of ignition by the spark plug 5 in the predetermined operating region. This predetermined operating region can be, for example, an operating region where stratified charge combustion (or this may also be spray-guided combustion) is carried out in which it becomes difficult to ignite or fire the air fuel mixture.

Here, FIG. 4 is a view showing the relation among the strength of an air stream in a cylinder 2, a period of time from fuel injection to ignition (an injection-ignition interval), and an amount of shift between the first nozzle hole 6a1 and the second nozzle hole 6a2. The amount of shift means an angle by which the nozzle holes 6a are shifted to the upstream side of the swirl around the center of the fuel injection valve 6, and also means an angle between the fuel spray 612 at the time of the ignition and the fuel spray 611 at the time of injection (or this may also be an angle between the fuel spray 622 at the time of ignition and the fuel spray 621 at the time of injection) in FIG. 2. "LARGE" in FIG. 4 shows that the amount of shift is large, and "SMALL" shows that the amount of shift is small. The strength of the air stream may also be the rotation speed of the swirl. The larger the strength of the air stream, or the longer the period of time from fuel injection to ignition, the longer the distance over which the fuel sprays are carried away in the period of time from fuel injection to ignition becomes, and hence, the larger the amount of shift is made so that so that fuel can be injected to the more upstream side in the direction of rotation of the swirl. That is, at the time of designing the fuel injection valve 6, the larger the strength of the air stream in the predetermined operating region, or the longer the period of time from fuel injection to ignition, the larger an angle by which the extension line of the first nozzle hole 6a1 and the extension line of the second nozzle hole 6a2 are shifted to the upstream side in the direction of rotation of the swirl around the central axis of the fuel injection valve 6 is made. Accordingly, the first nozzle hole 6a1 and the second nozzle hole 6a2 are formed based on the strength of the air stream and the period of time from fuel injection to ignition in the predetermined operating region. Here, note that the relation shown in FIG. 4 can be obtained through experiments, simulations, or the like.

In this manner, in the fuel injection valve 6 according to this embodiment, the nozzle holes 6a1, 6a2 are formed in such a manner that the positions of the fuel sprays 612, 622 after having been carried away by the swirl become suitable positions, respectively. For this reason, the nozzle holes 6a1, 6a2 are designed, and the relative relation between the spark plug 5 and the extension line of the first nozzle hole 6a1 and the relative relation between the spark plug 5 and the extension line of the second nozzle hole 6a2 are decided, in such a manner that the shortest distance between the extension line of the first nozzle hole 6a1 and the spark plug 5 becomes longer than the shortest distance between the extension line of the second nozzle hole 6a2 and the spark plug 5.

As described above, according to this embodiment, the first nozzle hole 6a1 and the second nozzle hole 6a2 are formed in consideration of the movements of the fuel sprays due to the swirl so that the fuel sprays exist in the ignitable region at the time of ignition of the spark plug 5, as a result of which ignition can be carried out in a more accurate manner. Accordingly, by using the fuel injection valve 6 according to this embodiment, it becomes possible to attain stable spray-guided combustion, for example. Moreover, it is also possible to suppress the generation of a smoke due to the deterioration of the combustion state, the discharge of unburnt fuel, the reduction of torque, etc.

Second Embodiment

The angles formed between the extension line 610 of the first nozzle hole 6a1 and the central axis 60 of the fuel injection valve 6 and between the extension line 620 of the second nozzle hole 6a2 and the central axis 60 of the fuel injection valve 6 (hereinafter, referred to as angles of sprays) are not specified in the first embodiment. In this second embodiment, these angles will be specified. In this second embodiment, the first nozzle hole 6a1 and the second nozzle hole 6a2 are formed in such a manner that the extension line 610 of the first nozzle hole 6a1 and the extension line 620 of the second nozzle hole 6a2 do not overlap with each other in the flow direction of the swirling flow.

Here, FIG. 5 is a view showing the relation between the spark plug 5 and the fuel sprays from the fuel injection valve 6 in the A-A cross section in FIG. 2, wherein an angle of spray (or spray angle) R1 according to the first nozzle hole 6a1 and an angle of spray (spray angle) R2 according to the second nozzle hole 6a2 are equal to each other. In addition, FIG. 6 is a view in the case of cutting the positions of the nozzle holes 6a in the fuel injection valve 6 along a cross section which is orthogonal or perpendicular to the central axis of the fuel injection valve 6. Moreover, FIG. 7 is a cross sectional view showing the fuel injection valve 6 having the first nozzle hole 6a1 and the second nozzle hole 6a2 corresponding to those in FIG. 5 cut along a B-B cross section in FIG. 6. An arrow in FIG. 5 indicates a direction in which the swirl flows. In FIG. 5, the fuel sprays 611, 612, which are located at the upstream side of the spark plug 5 in a direction in which the swirl flows, are the fuel sprays from the first nozzle hole 6a1, whereas the fuel sprays 621, 622, which are positioned at the downstream side of the spark plug 5 in a direction in which the swirl flows, are the fuel sprays from the second nozzle hole 6a2. Solid lines and broken lines in the fuel sprays in FIG. 5 are used with the same meaning as in FIG. 3. The spray angle R1 according to the first nozzle hole 6a1 is an angle formed by the extension line 610 of the first nozzle hole 6a1 and the central axis 60 of the fuel injection valve 6, and is also an angle representing how much the extension line 610 of the first nozzle hole 6a1 leans to a side face direction of the cylinder 2 (this may also be a horizontal direction) from the central axis of the fuel injection valve 6 in a direction toward the piston 3. The spray angle R2 according to the second nozzle hole 6a2 is an angle formed by the extension line 620 of the second nozzle hole 6a2 and the central axis 60 of the fuel injection valve 6, and is also an angle representing how much the extension line 620 of the second nozzle hole 6a2 leans to the side face direction of the cylinder 2 (this may also be the horizontal direction) from the central axis of the fuel injection valve 6 in the direction toward the piston 3.

In cases where the spray angle R1 according to the first nozzle hole 6a1 and the spray angle R2 according to the second nozzle hole 6a2 are equal to each other, there is no difference in the central axis direction (hereinafter a height or vertical direction) of the cylinder 2 between the fuel sprays, as shown by alternate long and short dash lines in FIG. 6. That is, the positions in the height direction of the fuel sprays 611, 612 from the first nozzle hole 6a1 and the fuel sprays 621, 622 from the second nozzle hole 6a2 are decided by the spray angle R1 according to the first nozzle hole 6a1 and the spray angle R2 according to the second nozzle hole 6a2, and hence, if the spray angles R1, R2 are the same, no difference will occur in the positions in the height direction of the fuel sprays 611, 612 and the fuel sprays 621, 622. For this reason, in cases where the fuel sprays from both the nozzle holes 6a1, 6a2 are projected in the direction of rotation of the swirl, both the fuel sprays overlap with each other. In that case, the flow of an air stream is inhibited by the fuel spray 612 from the first nozzle hole 6a1, so that the air stream becomes hard to directly impinge upon the fuel spray 622 from the second nozzle hole 6a2. That is, the fuel spray 622 from the second nozzle hole 6a2 becomes difficult to be exposed to the air stream, so that it becomes difficult to obtain the effect of the swirl.

On the other hand, if the spray angles R1, R2 are different from each other, there will occur a difference in the positions in the height direction of the fuel sprays 611, 612 and the fuel sprays 621, 622. Accordingly, in this second embodiment, the first nozzle hole 6a1 and the second nozzle hole 6a2 are formed in such a manner that the spray angle R1 according to the first nozzle hole 6a1 and the spray angle R2 according to the second nozzle hole 6a2 are different from each other. FIG. 8 is a view showing the relation between the spark plug 5 and the fuel sprays from the fuel injection valve 6 in the A-A cross section in FIG. 2, wherein the angle of spray R1 according to the first nozzle hole 6a1 and the angle of spray R2 according to the second nozzle hole 6a2 are different from each other. Moreover, FIG. 9 is a cross sectional view showing the fuel injection valve 6 having the first nozzle hole 6a1 and the second nozzle hole 6a2 corresponding to those in FIG. 8 cut along the B-B cross section in FIG. 6.

In this manner, the positions in the height direction of the fuel sprays 611, 612 from the first nozzle hole 6a1 and the fuel sprays 621, 622 from the second nozzle hole 6a2 are decided by the spray angle R1 according to the first nozzle hole 6a1 and the spray angle R2 according to the second nozzle hole 6a2, and hence, in cases where the spray angle R1 according to the first nozzle hole 6a1 and the spray angle R2 according to the second nozzle hole 6a2 are different from each other, there occurs a difference D1 in the height direction between the fuel spray 612 from the first nozzle hole 6a1 and the fuel spray 622 from the second nozzle hole 6a2. As a result of this, at least a part (a hatched portion in FIG. 8) of the fuel spray 622 from the second nozzle hole 6a2 is directly exposed to the air stream, so that the effect of the swirl becomes larger.

Here, note that in this second embodiment, the spray angle R1 according to the first nozzle hole 6a1 and the spray angle R2 according to the second nozzle hole 6a2 are set in such a manner that the fuel spray 612 from the first nozzle hole 6a1 and the fuel spray 622 from the second nozzle hole 6a2 do not overlap with each other by half or more thereof. That is, the spray angle R1 according to the first nozzle hole 6a1 and the spray angle R2 according to the second nozzle hole 6a2 are set in such a manner that an area formed by projecting the fuel spray 612 from the first nozzle hole 6a1 in the direction of rotation of the swirl and an area formed by projecting the fuel spray 622 from the second nozzle hole 6a2 in the direction of rotation of the swirl do not overlap in a half or more thereof. In this case, in FIG. 8, the difference D1 becomes equal to or more than a radius of each of the fuel sprays. Thus, by making the fuel spray 612 from the first nozzle hole 6a1 and the fuel spray 622 from the second nozzle hole 6a2 in such a manner that a half or more of the fuel spray 612 does not overlap with a half or more of the fuel spray 622 in the direction of rotation of the swirl, the effect of the swirl can be made high, in the fuel spray 622 from the second nozzle hole 6a2, too. Here, note that how much the spray angle R1 according to the first nozzle hole 6a1 and the spray angle R2 according to the second nozzle hole 6a2 should be shifted from each other changes depending on the range where each fuel spray spreads, but when shifting the spray angles, for example, by at least 5 degrees from each other, it is possible to suppress the fuel sprays from overlapping with each other in a half or more thereof. In this case, it is assumed that each fuel spray spreads, for example, in a range of 10 degrees from each nozzle hole 6a. In addition, in consideration of the range in which a fuel spray in a general fuel injection valve spreads, an upper limit of the angle by which the spray angles are shifted from each other may be set to 25 degrees. That is, the difference between the spray angles may also be equal to or more than 5 degrees and less than 25 degrees.

Here, note that in the case of shifting the spray angle R1 according to the first nozzle hole 6a1 and the spray angle R2 according to the second nozzle hole 6a2 from each other, there can be considered a case where the spray angle R1 of the first nozzle hole 6a1 is made larger than the spray angle R2 of the second nozzle hole 6a2, and a case where the spray angle R1 of the first nozzle hole 6a1 is made smaller than the spray angle R2 of the second nozzle hole 6a2. Here, the larger the spray angles, the closer the fuel sprays come to the spark plug 5 in the height or vertical direction. The above-mentioned FIG. 8 shows the case where the spray angle R1 of the first nozzle hole 6a1 is made larger than the spray angle R2 of the second nozzle hole 6a2. On the other hand, FIG. 10 is a view showing the relation between the spark plug 5 and the fuel sprays from the fuel injection valve 6 in the A-A cross section in FIG. 2, wherein the angle of spray R1 of the first nozzle hole 6a1 is made smaller than the angle of spray R2 of the second nozzle hole 6a2. In the case of FIG. 8, the positions in the height direction of the fuel sprays 611, 612 from the first nozzle hole 6a1 becomes higher than the positions of the fuel sprays 621, 622 from the second nozzle hole 6a2, whereas in the case of FIG. 10, the positions in the height direction of the fuel sprays 611, 612 from the first nozzle hole 6a1 becomes lower than the positions of the fuel sprays 621, 622 from the second nozzle hole 6a2.

Here, even in cases where the spray angle R1 of the first nozzle hole 6a1 is made smaller than the spray angle R2 of the second nozzle hole 6a2 (FIG. 10), there occurs a difference D2 in the height direction between the fuel spray 612 from the first nozzle hole 6a1 and the fuel spray 622 from the second nozzle hole 6a2. As a result of this, at least a part of the fuel spray 622 from the second nozzle hole 6a2 is directly exposed to the air stream, so that the effect of the swirl becomes larger. However, when the spray angle R2 of the second nozzle hole 6a2 is made too large, there is a fear that the fuel spray 621 from the second nozzle hole 6a2 may impinge on the spark plug 5 at the time of fuel injection. For this reason, there is a fear that the liquid fuel injected from the second nozzle hole 6a2 may adhere to the spark plug 5. When the liquid fuel adheres to the spark plug 5, it may become difficult to ignite the fuel spray.

On the other hand, in cases where the spray angle R1 of the first nozzle hole 6a1 is made larger than the spray angle R2 of the second nozzle hole 6a2 (FIG. 8), the fuel spray 621 immediately after fuel is injected from the second nozzle hole 6a2 is more away from the spark plug 5 than in the case shown in FIG. 10. Accordingly, it is possible to suppress the fuel injected from the second nozzle hole 6a2 from adhering to the spark plug 5. In the first embodiment, the first nozzle hole 6a1 and the second nozzle hole 6a2 are formed in consideration of the movements of the fuel sprays due to the swirl so that the fuel sprays exist in the ignitable positions at the time of ignition of the spark plug 5, but in addition, if taking the spray angles into consideration as in this embodiment, more stable combustion will be attained.

Here, note that in this second embodiment, reference has been made to the case where the swirl around the central axis of the cylinder 2 has occurred, but the central axis of the swirl may become aslant or oblique with respect to the central axis of the cylinder 2. That is, an air stream may impinge on the fuel sprays not from a horizontal direction but from an oblique direction. FIG. 11 is a view showing the relation between the spark plug 5 and the fuel sprays from the fuel injection valve 6 in the A-A cross section in FIG. 2, wherein an air stream impinges on the fuel sprays from an oblique direction. Even in such a case, by making the fuel sprays 612, 622 not overlap each other in a half or more thereof in the direction in which the air stream flows, the air stream can be made to directly impinge on a part of the fuel spray from the second nozzle hole 6a2.

As described above, according to this second embodiment, by shifting the spray angle R1 of the first nozzle hole 6a1 and the spray angle R2 of the second nozzle hole 6a2 from each other, the fuel spray from the second nozzle hole 6a2 is exposed to a larger amount of air stream. Accordingly, it is possible to make the difference small between the states of the fuel sprays 612, 622 from both the nozzle holes at the time of ignition. For this reason, the fuel sprays 612, 622 from both the nozzle holes can be both formed in their desired states. With this, stable combustion can be attained. Further, by making the spray angle R1 of the first nozzle hole 6a1 larger than the spray angle R2 of the second nozzle hole 6a2, it is possible to suppress the fuel injected from the second nozzle hole 6a2 from adhering to the spark plug 5, thus making it possible to attain more positive or reliable ignition.

Third Embodiment

In the above-mentioned embodiments, reference has been made to the case where a swirl has occurred as a swirling flow, but in this third embodiment, reference will be made to the case where tumbles have occurred as swirling flows. A tumble is a swirling flow which rotates about an axis orthogonal to the central axis of a cylinder 2. FIG. 12 is a view looking at the fuel sprays from the upper side of the cylinder 2 in the case where tumbles have occurred therein. FIG. 12 shows the case where there has occurred air streams due to the tumbles each flowing from an intake valve 9 side toward an exhaust valve 10 side in the vicinity of a fuel injection valve 6 and a spark plug 5 (refer to alternate long and two short dashes lines). In addition, the spark plug 5 and the fuel injection valve 6 are disposed in such a manner that they align with each other in a direction which is orthogonal to a swirling direction. That is, the spark plug 5 and the fuel injection valve 6 are disposed in such a manner that they align with each other in parallel to the central axis of each tumble. Then, a first nozzle hole 6a1 is formed so as to open toward an intake valve 9 side rather than toward the spark plug 5, and a second nozzle hole 6a2 is formed so as to open toward an exhaust valve 10 side rather than toward the spark plug 5, In that case, the fuel spray 612 from the first nozzle hole 6a1 is carried away by a tumble, so that it comes near to the spark plug 5. On the other hand, the fuel spray 622 from the second nozzle hole 6a2 is carried away by the tumble, so that it moves away from the spark plug 5. Accordingly, the individual nozzle holes 6a are formed so that the shortest distance between an extension line 610 of the first nozzle hole 6a1 arranged at the intake valve 9 side and the spark plug 5 becomes longer than the shortest distance between an extension line 620 of the second nozzle hole 6a2 arranged at the exhaust valve 10 side and the spark plug 5. According to this, even if the fuel sprays 612, 622 are carried away by the tumble, each of the fuel sprays 612, 622 will be located in a range in which it can be ignited by the spark plug 5, so that fuel can be ignited or fired in a more accurate manner.

Thus, in the case of a tumble, similar to the case of a swirl, the individual nozzle holes 6a1, 6a2 are formed in such a manner that the fuel sprays 612, 622 can be located in the vicinity of the spark plug 5 at the time of ignition by the spark plug 5, in a predetermined operating region in which spray-guided combustion is carried out.

In addition, in the case where a swirling flow is a tumble, too, as in the case of the second embodiment, by making the spray angle R1 of the first nozzle hole 6a1 larger than the spray angle R2 of the second nozzle hole 6a2, it is possible to suppress the fuel injected from the second nozzle hole 6a2 from adhering to the spark plug 5.

As described above, according to this third embodiment, even in the case where a tumble occurs, stable combustion can be attained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An internal combustion engine in which a swirling flow occurs in a cylinder, said engine comprising:
    an electronic control unit;
    a fuel injection valve that has a plurality of nozzle holes including at least a first nozzle hole and a second nozzle hole for injecting fuel into said cylinder; and
    a spark plug that is disposed at a position through which said swirling flow flows, and which is at the downstream side of the flow of said swirling flow from an extension line of said first nozzle hole and at the upstream side of the flow of said swirling flow from an extension line of said second nozzle hole, said spark plug to ignite sprays of fuel injected from said fuel injection valve; wherein
    said first nozzle hole and said second nozzle hole are formed in such a manner that a shortest distance from the extension line of said first nozzle hole to said spark plug is longer than a shortest distance from the extension line of said second nozzle hole to said spark plug, and
    a timing of an ignition of the spark plug is controlled such that the ignition occurs when outer edges of the sprays of fuel that are carried away by the swirling flow are in an ignitable region of the spark plug such that each of the sprays are ignited at the same time.

2. The internal combustion engine as set forth in claim 1, wherein
    said first nozzle hole and said second nozzle hole are formed in such a manner that the extension line of said first nozzle hole and the extension line of said second nozzle hole do not overlap with each other in a flow direction of said swirling flow.

3. The internal combustion engine as set forth in claim 2, wherein
    said first nozzle hole and said second nozzle hole are formed in such a manner that an angle formed by the extension line of said first nozzle hole and a central axis of said fuel injection valve becomes larger than an angle formed by the extension line of said second nozzle hole and the central axis of said fuel injection valve.

4. The internal combustion engine as set forth in claim 2, wherein
    said first nozzle hole and said second nozzle hole are formed in such a manner that a fuel spray from said first nozzle hole does not overlap with a half or more of a fuel spray from said second nozzle hole in the flow direction of said swirling flow.

5. The internal combustion engine as set forth in claim 4, wherein
    said first nozzle hole and said second nozzle hole are formed in such a manner that an angle formed by the extension line of said first nozzle hole and a central axis of said fuel injection valve becomes larger, by at least 5 degrees, than an angle formed by the extension line of said second nozzle hole and the central axis of said fuel injection valve.

6. The internal combustion engine as set forth in claim 1, wherein
    directions of said first nozzle hole and said second nozzle hole are shifted to the upstream side of said swirling flow from a region in which the fuel sprays from the fuel injection nozzle can be ignited by said spark plug, by an angle by which the fuel sprays are rotated due to said swirling flow in a duration from the fuel injection by said fuel injection valve until the ignition by said spark plug, the shortest distance from the extension line of said first nozzle hole to said spark plug is made longer than the shortest distance from the extension line of said second nozzle hole to said spark plug.

7. The internal combustion engine as set forth in claim 1, wherein
    said swirling flow is a swirl turning around the central axis of said fuel injection valve.

8. The internal combustion engine as set forth in claim 4, wherein
    said plurality of nozzle holes are shifted by an angle through which the fuel spray rotates from fuel injection.

9. The internal combustion engine as set forth in claim 1, wherein
    said sprays of fuel are symmetric with said spark plug at a time of ignition.

10. The internal combustion engine as set forth in claim 1, wherein
    an angle formed by a line connecting said spark plug with said fuel injection valve and said extension line of said first nozzle hole is larger than an angle formed by said line connecting said spark plug with said fuel injection valve and said extension line of said second nozzle hole.

* * * * *